United States Patent
Hartog

(10) Patent No.: US 9,949,112 B2
(45) Date of Patent: Apr. 17, 2018

(54) SYSTEM TO PROTECT A MOBILE NETWORK

(71) Applicants: Koninklijke KPN N.V., The Hague (NL); Nederlandse Organisatie voor Toegepast-Natuurwetenschappelijk Onderzoek TNO, 's-Gravenhage (NL)

(72) Inventor: Tim Hartog, The Hague (NL)

(73) Assignees: Koninklijke KPN N.V., The Hague (NL); Nederlandse Organisatie voor Toegepast-Natuurwetenschappelijk Onderzoek TNO, 's-Gravenhage (NL)

( * ) Notice: Subject to any disclaimer, the term of this patent is extended or adjusted under 35 U.S.C. 154(b) by 0 days.

(21) Appl. No.: 14/649,392

(22) PCT Filed: Dec. 9, 2013

(86) PCT No.: PCT/EP2013/075937
§ 371 (c)(1),
(2) Date: Jun. 3, 2015

(87) PCT Pub. No.: WO2014/090740
PCT Pub. Date: Jun. 19, 2014

(65) Prior Publication Data
US 2015/0319610 A1    Nov. 5, 2015

(30) Foreign Application Priority Data

Dec. 10, 2012 (EP) ..................................... 12196307

(51) Int. Cl.
*H04B 15/00* (2006.01)
*H04B 17/00* (2015.01)
(Continued)

(52) U.S. Cl.
CPC ........... *H04W 8/24* (2013.01); *H04L 63/1441* (2013.01); *H04W 12/12* (2013.01); *H04W 36/0094* (2013.01)

(58) Field of Classification Search
CPC ..... H04W 8/205; H04W 16/14; H04W 4/003; H04W 52/0212; H04W 76/02;
(Continued)

(56) References Cited

U.S. PATENT DOCUMENTS

| 8,155,649 B2 * | 4/2012 | McHenry | H04L 27/0006 |
| | | | 455/418 |
| 8,175,104 B2 * | 5/2012 | Connelly | G06F 8/65 |
| | | | 370/338 |

(Continued)

FOREIGN PATENT DOCUMENTS

| CN | 101778099 A | 7/2010 |
| KR | 100628329 B1 | 9/2006 |

OTHER PUBLICATIONS

European Search Report, European Patent Application No. 12196307.8, dated May 21, 2013.
(Continued)

*Primary Examiner* — William D Cumming
(74) *Attorney, Agent, or Firm* — McDonnell Boehnen Hulbert & Berghoff LLP

(57) ABSTRACT

A system is described for controlling a mobile telecommunications device, in which the mobile device includes an enforcer which can be controlled by the telecommunications network. The telecommunications network signals the enforcer in order to gain control of the mobile device. The enforcer may be a hardware component within the mobile telecommunications device and in particular is coupled between the baseband and applications processors. The system allows a telecommunications network to gain control of a device in the event that the device is corrupted by rogue
(Continued)

or malicious software and behaves in a way deleterious to the network.

12 Claims, 8 Drawing Sheets

(51) Int. Cl.
| | |
|---|---|
| *H04M 11/00* | (2006.01) |
| *H04M 3/00* | (2006.01) |
| *H04W 4/00* | (2009.01) |
| *H04B 7/00* | (2006.01) |
| *H04B 1/38* | (2015.01) |
| *H04W 8/24* | (2009.01) |
| *H04L 29/06* | (2006.01) |
| *H04W 12/12* | (2009.01) |
| *H04W 36/00* | (2009.01) |

(58) Field of Classification Search
CPC ..... H04W 74/02; H04W 84/06; H04W 12/06; H04W 28/14
USPC ...... 455/62, 418, 422.1, 509, 557, 406, 419; 370/252, 277, 328, 329, 338, 342, 316; 709/224; 713/716
See application file for complete search history.

(56) References Cited

U.S. PATENT DOCUMENTS

| | | | |
|---|---|---|---|
| 8,306,522 B1 | 11/2012 | Delker et al. | |
| 8,326,313 B2* | 12/2012 | McHenry | H04W 16/14 370/277 |
| 8,392,961 B2* | 3/2013 | Bhola | G06F 21/6218 370/342 |
| 8,818,283 B2* | 8/2014 | McHenry | H04W 16/14 455/62 |
| 8,909,220 B1* | 12/2014 | Aftahi | H04B 7/2041 370/316 |
| 2005/0075992 A1* | 4/2005 | Gavan | H04J 3/175 706/10 |
| 2006/0288407 A1 | 12/2006 | Naslund et al. | |
| 2007/0283445 A1 | 12/2007 | Kaneko | |
| 2008/0133719 A1* | 6/2008 | Amitai | H04L 41/0893 709/221 |
| 2008/0134296 A1* | 6/2008 | Amitai | H04L 63/102 726/4 |
| 2008/0162715 A1 | 7/2008 | Wary | |
| 2008/0201381 A1* | 8/2008 | Desai | G06F 17/30286 |
| 2008/0229428 A1* | 9/2008 | Camiel | G06F 17/30082 726/27 |
| 2009/0013189 A1* | 1/2009 | Morvan | G06K 9/00711 713/176 |
| 2009/0221278 A1* | 9/2009 | Spelta | H04W 8/205 455/418 |
| 2009/0251282 A1 | 10/2009 | Fitzgerald et al. | |
| 2010/0064341 A1 | 3/2010 | Aldera | |
| 2010/0075704 A1* | 3/2010 | McHenry | H04W 16/14 455/509 |
| 2010/0105332 A1* | 4/2010 | McHenry | H04W 16/14 455/62 |
| 2010/0173586 A1* | 7/2010 | McHenry | H04L 27/0006 455/62 |
| 2012/0129516 A1* | 5/2012 | Skedinger | H04L 12/185 455/422.1 |
| 2012/0131184 A1* | 5/2012 | Luna | H04W 28/14 709/224 |
| 2012/0243477 A1* | 9/2012 | Shinada | H04W 8/22 370/328 |
| 2012/0258777 A1* | 10/2012 | Huang | H04W 4/003 455/557 |
| 2015/0081906 A1* | 3/2015 | Backholm | H04W 74/06 709/225 |
| 2015/0223192 A1* | 8/2015 | Cao | H04W 52/0212 370/252 |
| 2015/0319610 A1* | 11/2015 | Hartog | H04L 63/1441 455/419 |
| 2016/0029402 A1* | 1/2016 | Backholm | H04W 76/02 370/329 |
| 2016/0381603 A1* | 12/2016 | Vuornos | H04L 12/1432 455/406 |

OTHER PUBLICATIONS

PCT Search Report and Written Opinion, PCT International Application No. PCT/EP2013/075937, dated May 15, 2014.

Mulliner, Collin et al., "Taming Mr. Hayes: Mitigating Signaling Based Attacks on Smartphones", IEEE/IFIP International Conference on Dependable Systems and Networks (DSN 2012), 2012, pp. 1-12.

* cited by examiner

SYSTEM TO PROTECT A MOBILE NETWORK

CROSS REFERENCE TO RELATED APPLICATIONS

The present application is a national stage entry of, and claims priority to, PCT/EP2013/075937, filed on Dec. 9, 2013, which claims priority to European Patent Application EP 12196307.8, filed in the European Patent Office on Dec. 10, 2012, both of which are hereby incorporated in their entirety herein by reference.

FIELD OF INVENTION

The invention relates to a system for control of a mobile telecommunications device, and further relates to a mobile telecommunications device arranged to communicate with a telecommunications network.

BACKGROUND

Telecommunications networks provide radio telecommunication to users of mobile devices, typically according to agreed and standardised radio protocols, for example GSM, UTMS and LTE as would be known by the skilled person.

Mobile telecommunications devices are common and include mobile phones and in particular smartphones, tablet devices and other handheld computer devices, handheld personal assistants, and even communication devices situated in vehicles. All can provide users with telecommunication with each other and with access to the internet while moving around.

Access to the internet exposes devices to malware and malicious applications that may be downloaded, accidentally or otherwise, onto the mobile device from the internet. Typically, and often because of their smaller size and memory capacity, mobile telecommunications devices do not contain security features which are as stringent as those available for desk computers and other large devices with internet access. As such, these smaller mobile telecommunications devices are vulnerable to infection and attack by malware and malicious applications, which will typically infect the application processor of a mobile device. But because mobile telecommunications devices are also typically in direct contact with a radio telecommunications network the telecommunications network itself is vulnerable to attack from any malware or malicious applications residing on the mobile devices.

Previous methods to protect a telecommunications network from mobile device behaviour have sometimes focused on non-malicious device behaviour, such as congestion. For example, EP 2 096 884 describes a method of allowing access to a network by a device and describes use of a back off timer when the network is congested. Previous methods have also focused on methods which are applied entirely within the mobile handset itself. For example, "Taming Mr Hayes: Mitigating signaling based attacks on smartphones", IEEE/IFIP International Conference on Dependable Systems and Networks (DSN 2012), 2012, dsn, pp. 1-12, Collin Mulliner, Steffen Liebergeld, Matthias Lange, Jean-Pierre Seifert, describes a method of protecting a network from actions of a mobile phone by controlling the mobile phone from within. A method is proposed to detect aberrant or malicious behaviour from within the application processor of the mobile phone itself using a virtual partition of the application processor.

A disadvantage of this method is that the subsequent control of the phone, after malicious behaviour has been detected and according to the method described, is directed from inside the mobile device itself. But if the mobile device has been infected with malware there can be no real certainty that either the detection method or the subsequent control of device behaviour can be trusted. In operation of the method an infected mobile phone polices itself but the telecommunications network with which the phone is attached cannot be sure that the mobile phone can be trusted.

Similarly, US 2006/0288407 describes a method to perform detection on a mobile handset and therefore has a similar disadvantage.

Nevertheless, it is a problem to defend the network against attacks from a mobile telecommunications device infected with malware or a malicious application.

SUMMARY

The problem is solved according to the invention as described in the claims.

The claims describe a system for control of a mobile telecommunications device wherein a telecommunications network is configured to allow communication by mobile telecommunications devices and at least one mobile telecommunications device is arranged to communicate with the telecommunications network. In this system the mobile telecommunications device comprises an enforcer and the telecommunications network is configured to control the mobile telecommunications device by signalling the enforcer.

This solves the problem of how to defend the telecommunications network from a device infected by malware because the network itself takes control of the device through a new device element, an enforcer, or enforcement module, which the telecommunications network contacts by signalling.

In this way control of the mobile device is taken from the device itself and given to the network. The network, in taking control of the mobile device, can then stop certain actions from being performed by the mobile device, limit traffic from the mobile device into the network, or force the mobile to take certain actions that it would not otherwise do.

Allowing the telecommunications network a mechanism by which it can take control of the mobile telecommunications device provides several advantages. Firstly it has the advantage that control of any malicious behaviour enacted by the device can be performed outside the mobile itself, thereby making control of the mobile device less dependent on the state of the mobile. If the mobile device is infected then the malware or malicious software with which it is infected is less likely to interfere with the control mechanism. Secondly it has the advantage that control can be independent of the differing operating systems now commonly used in mobile handsets.

According to the system of the invention the mobile telecommunications device is arranged to receive and act on instructions from the network. As would be known by the skilled person, signals from the network are received through the antenna and processed into code according to the internal language and operating system of the device itself. In order to act on signals received from the network the mobile telecommunications device now comprises an enforcer, which is an enforcement module element able to apply decisions taken in the network and signalled to the mobile device by the telecommunications network. The enforcer is a new entity in the mobile. Within the system of the invention there are several options for providing the enforcer.

The enforcer can be a new hardware component sited within the mobile device and there are two main embodiments by which this can be arranged.

The enforcer can be arranged as a separate component within the device, for example as a separate chip within the chipset of the mobile device. Advantageously in this embodiment the enforcer is coupled to the baseband processor in such a way that it can read communication traffic, in other words code, that passes into the baseband processor from the applications processor, or which passes out of the baseband processor to the applications processor. In a particularly advantageous embodiment the enforcer is coupled directly between the application processor and the baseband processor in the chipset topology. In this way the functionality of the enforcer can be arranged simply and efficiently within the mobile telecommunications device.

In a further advantageous embodiment a dedicated communication channel is used for all communication that flows between the enforcer and the baseband processor. This ensures that signals received by the mobile device and intended for the enforcer can be delivered to the enforcer without risk that they may be intercepted by any malicious software resident on the mobile device.

Alternatively the enforcer can be supplied within the baseband processor as a hardware component. In this embodiment the enforcer should be incorporated into the baseband processor in such a way that the enforcer is able to read the communication traffic that passes between the baseband processor and the application processor.

The function of the enforcer is to take decisions and enforce policies on the communication between the application and baseband processor and it is advantageous if the enforcer is written in such a way that it reads the same code as the application processor. However the enforcer, typically, does not act on its own but instead acts under instruction from the network.

To operate the system the telecommunications network signals the enforcer in the mobile telecommunications device when the network identifies the device as being infected, or possibly infected, with malware or malicious software.

The telecommunications network is arranged to identify a mobile telecommunications device which is attached to the network and to detect indicators, or symptoms, that the device is infected with malware or malicious software. Typically it is possible for the network to detect indicators of malware infection because the malware causes an alteration to the normal behaviour of the mobile device.

Upon detection of suspected malicious behaviour the telecommunications network makes a decision, based upon the detected behaviour, about how to control the mobile device. This decision can be made, in an advantageous embodiment, using a decision tree in which the detected behaviour of the mobile device is parsed, or processed, to derive a resulting action. The resulting action may be the selection of a rule from a rule set, which may then be signalled to the enforcer if the rule requires action on by the enforcer. It is not always necessary that the enforcer is signalled and generally the rule may or may not be communicated to the enforcer depending upon where action is to be taken. In this embodiment the enforcer is only signalled when the enforcer is required to take action.

In an alternative embodiment, the network detects the altered behaviour of the mobile device but signals instead an indication of the behaviour to the enforcer. In this embodiment the enforcer contains the decision tree and uses the signalled indication of mobile behaviour to derive a rule from its decision tree. In this case the enforcer may derive a rule which indicates an action to take or may alternatively derive a rule instructing it to take no action.

The rule set is typically a table, database, or other memory, as would be understood by the skilled person. In each case the rule set is also dynamic in the sense that it can be programmed or upgraded by the telecommunications network to address new scenarios. In the embodiment in which the rule set is derived in the mobile device itself the telecommunications network upgrades the rule set by signalling the enforcer with new rules.

Both embodiments result in the enforcer being in possession of a rule allowing action to be taken against the mobile device when malicious behaviour by the mobile device is detected. The rule is then applied by the enforcer.

Examples of rules are:
a) disallow downloads from a named IP address
b) disallow attach or detach for next 10 mins
c) following 10 mins from receipt of message, reduce the bandwidth to a defined number of MB Typically, as the skilled person would understand, rules are written in the code of the enforcer.

The enforcer comprises a memory, or checklist, capable of holding the list of rules supplied to it by the telecommunications network. Initially in operation the enforcer has an empty checklist and as the telecommunications network signals the enforcer the checklist fills with rules to be applied.

The enforcer also comprises a processor to enable it to apply any rule that it either receives from the network or which it generates itself.

The rules need not be applied in the order in which they are either received or generated. This is because the event to which the rule applies may not apply to the next event that occurs in the mobile. The enforcer therefore monitors all signals between the application processor and the baseband processor in order to apply rules to the correct events.

By applying the rules in the checklist the enforcer therefore controls the behaviour of the mobile device.

This solves the problem of controlling a mobile device in the telecommunications network.

Detection of malicious behaviour can be achieved according to the following method.

A system can be used for detecting behaviour of a mobile telecommunications device in a telecommunications network. Typically this behaviour will be malicious, or abnormal, behaviour. The system includes a telecommunications network configured to identify at least one mobile telecommunications device and to receive signals from the mobile telecommunications device and further to process the signals into data streams. The data streams include data of a first type arranged to cause an event of a first type within the telecommunications network. The network is arranged to monitor an occurrence in the data streams of the data of the first type and is arranged to register when the occurrence exceeds a level indicating acceptable behaviour of the mobile telecommunications device in the telecommunications network.

This system identifies malicious, or abnormal, behaviour in a mobile device, but identifies it from within the telecommunications network itself. This is done by monitoring the data streams, or transfers of data, which occur in the network due to the interaction between the network and the mobile. This data is monitored for excessive occurrences of particular signals.

Malware resident on a mobile device may cause that device to indulge in malicious behaviour, which is typically anything that uses up network resources without being for an express user intention. Typically it is anything which uses up network resources but without resulting in a benefit for the user or for the device. For example, a user of a mobile device may wish to download a video to watch on the device. This will use up resources but the use of resources in this case is time limited and in any event, once the video is downloaded the user spends time watching the video and while doing so is unlikely to download other videos or perform other tasks. Malware, however, may be programmed to download videos continuously, and this uses excessive network resources. In an alternative example, malware may be programmed to continuously perform attach and detach of the mobile device onto the network. This will use excessive network resources because the network will try to authenticate the mobile device every time the device attaches. The continuous attach and detach however does not result in an advantage for either the user or the mobile device. In an alternative example, malware may be programmed to manipulate signal level reports used by the network for handover decisions. The mobile device continuously measures the signal levels from base stations in the surrounding cells and reports the signal levels to the network. The network uses this, and other information, to device whether or not to handover the communication with the mobile device to a different base station than the one that is currently serving the mobile device. Malware could be programmed to manipulate the measurement reports in such a way that a very large number of handovers takes place, which uses excessive network resources. In an alternative example the malware may be programmed to force the mobile device which carries the malware to continuously request call forwarding. When a request for call forwarding is made the device requests the network to forward incoming calls to a second number. The continuous making of this request will use up network resources. In an alternative example the malware may constantly request the setting up of bearers, and in particular new bearers, between the device and the network. Again, this uses up network resources. In an alternative example the malware may force the mobile device which carries the malware to continuously make requests for service without using the proffered services. These requests may be for any kind of service typically provided by the telecommunications network but it wastes network resources when the continuous requests for service do not result in a provided service which benefits either the user or the mobile device making the request.

In all these examples an exchange of data occurs between the mobile device and the telecommunications network but also further within the telecommunications network itself. When the mobile device transmits signals to the telecommunications network they are received in a base station and processed into data streams internal to the telecommunications network. For example, if an attach request is made by a mobile device then the telecommunication network which receives the attach request makes an attempt to authenticate the mobile device. This results in data streams, or signals, being sent between, for example in the case of a UMTS network, the radio network controller RNC, the mobile switching centre MSC, the Home Location Register HLR, and the Authentication Centre AuC, as would be known by the skilled person. As would also be known by the skilled person, other malicious behaviours described would also result in signalling, or data streams, transmitted not just between the device and the network but also within the network itself.

The network can therefore detect malicious behaviour by monitoring the occurrence in the data streams in the network of data of a first type, typically a predetermined type which represents some interaction in the network between network devices for the normal processing of signals. Further the network registers when this occurrence exceeds a level which indicates acceptable behaviour of the mobile telecommunications device in the telecommunications network. In other words, the network detects malicious behaviour by monitoring for, and detecting, the incidence of various types of data steams within the network itself and registering when the occurrence is too high.

For example, in order to detect the malicious behaviour in which a device continuously attempts to attach and detach the network may count the number of times the Mobile Switching Centre, MSC, is caused to request authentication of the device at the Authentication Centre AuC, or alternatively count the number of times the Authentication Centre AuC signals back a reply.

In a particularly advantageous embodiment the detection of data steams is performed in the core network, and in particular in the Mobility Management Entity MME if the network is an LTE network, in the MSC if it is a UMTS or GSM network or the Serving Gateway Support Node SGSN in a GPRS network. In this embodiment the incidence of particular, or predetermined, data streams can be identified in a central location within each respective network. This has the advantage that it reduces the time it takes for the telecommunications network to identify mobile devices which may be infected by malware.

However the occurrence of specific data streams may be detected further back in the network. In an example of this, excessive attach requests may be detected at the AuC by detecting authentication attempts per mobile device. Alternatively, excessive attach requests may be detected by counting at the HLR the number of times the network requests data regarding a particular mobile device.

In certain embodiments detection could be performed in the eNodeB or base station. This has the advantage that detection of malicious behaviour uses fewer network resources. For example, excessive numbers of attach and detach could be detected in the receiving base station. However, a particular disadvantage of performing detection at the base station, for example, occurs when signals from the mobile device arrive in the network through different base stations, and one example of this is when a device is physically moving quickly across base station cells. In such a case no one particular base station, or eNodeB, will necessarily receive the full signalling from the device and therefore no one base station will be able to unambiguously perform detection.

In a particularly advantageous embodiment the network counts the occurrence of particular data signals when their rate of occurrence exceeds a predetermined temporal rate. For example, if the network is monitoring for the sending of an authentication request to the AuC, the network is arranged to detect when the rate of transmission of authentication requests for a particular mobile exceeds a predetermined threshold and also to count the number of times authentication is then requested, while the rate of authentication requests exceeds the predetermined rate.

In other words the network monitors for, and detects when the frequency of a certain predetermined signal or data occurrence in the data streams becomes too high. The network then proceeds to count the number of occurrences while the rate remains above the predetermined temporal rate.

This particular embodiment is even more advantageous if the network is further arranged to register when the number of detected occurrences itself exceeds a predetermined threshold. In our example this would mean that the network registers when the number of authentication requests exceeds a certain number, with each authentication request having been received at a rate which is greater than the predetermined temporal rate.

In a further advantageous embodiment, the network can detect if the rate of occurrence of a signal or data event, for example a request for authentication transmitted to the AuC, occurs at or above a predetermined temporal rate by measuring the time elapsed between successive occurrences. In this embodiment the network is arranged to detect the time elapsed between two consecutive authentication requests to the AuC, in our example, and calculate when this elapsed time is less than a predetermined time interval. The data occurrences are deemed to occur at a rate which exceeds the predetermined rate when they occur within the respective predetermined time interval.

In a particularly advantageous example the network includes a counter, C, and is arranged to detect a detectable event, X, which occurs within the network, for example the first instance of an attach, or, the transmission of a request for authentication to the AuC, or, the arrival of signaling in the MME indicating that a handover has taken place, and starts the counter.

The counter then becomes:

$C=1$

At the same time the network starts a timer. The counter is stored and associated with the mobile device.

If the next detection of X in the network takes place within a predetermined time interval then the counter becomes:

$C=2$

In an embodiment the timer measures a time t from the first detection of X and in this case the counter is incremented by 1 if the next detection occurs at a time, $t<\Delta$, where $\Delta$ is the predetermined time interval. In an alternative embodiment the time at each detection of the event X is registered, the time of the first event, ST, being stored and associated with the mobile device. A timer, T, is started at ST and the counter is incremented if the time of the next detected event X is t where:

$t<ST+\Delta$

Within this embodiment the value of ST is then replaced by the new time NT at which the second event X was detected.

In both embodiments the counter is incremented again if the following detection of X occurs within the same time interval. In such a case the counter would now register:

$C=3$

If the counter reaches a predetermined threshold, say $C_n$, in which case the counter becomes:

$C=C_n$ the telecommunications network registers the fact. This may be done by setting a flag, but the skilled person knows that there are alternative methods of registering.

In an alternative embodiment the network registers if the counter exceeds a predetermined threshold. If X is not detected again within the predetermined time interval, the counter goes back to zero.

In an alternative embodiment the network could monitor and count the number of detachments of a particular mobile device.

In an embodiment in which handover is detected, the following further embodiment is particularly advantageous. The network maintains a record of the tracking area of the mobile device and also an indication of when the tracking area changes. This allows the network to know when the device is moving. If the network registers an excessive number of handovers the tracking area information can be used to discount excessive handovers when the device is actually in physically rapid movement.

In a further embodiment the network registers when a device switches frequently between neighbouring bases stations. This is an indication of genuine mala fide behaviour as normally such switches are suppressed by existing handover algorithms to avoid excessive handover of a mobile device that is actually physically situated on the border between two cells.

In an alternative, and particularly advantageous embodiment, the network monitors improbable service request combinations. For example, it is unlikely that a user would request the streaming of five movie downloads in parallel. Equally unlikely is that the user would genuinely attempt to listen to his own voice mail while making a telephone Following detection of malicious behaviour the network can perform several actions. These include: detaching the mobile device; sending a signal to the device to permanently block access to the network; starting a back off timer to stop the mobile device from making another connection request within a certain time period; send a warning message to the owner of the device. In the last example the warning could be transmitted to the mobile device itself, via sms for example, however if the device is infected by malware and cannot be trusted then the network cannot assume any warning message transmitted to the device itself will be seen or heard by the user. Therefore a warning could be transmitted to the user via other channels relying on other data stored for the user, for example by email to a known email address.

In a further advantageous embodiment the network tracks the behaviour of several devices and aggregates the results. In this way malware behaviour can be tracked and monitored across an entire network.

In a further advantageous embodiment the network monitors for the occurrence of data of a second type in the data streams. Typically the data streams that are passed around the network include more than one type of data and in addition to including data of a first type arranged to cause an event of a first type within the telecommunications network, may include data of a second type arranged to cause an event of a second type with the telecommunications network. In a particularly advantageous embodiment the network may monitor for malicious behaviour of a mobile device by monitoring for the occurrence of both data of the first and second type, determining when each exceeds some predetermined threshold. In this case each can exceed a predetermined threshold individually, and the predetermined thresholds can be different or be the same, or, both occurrences can be aggregated and can be compared to a single predetermined threshold together. In an example the network could monitor for data occurrences in the network indicating device attach, as has already been described, but additionally monitor for data occurrences indicating device detach, and only if both occurrences exceed independent predetermined thresholds does the network register that malicious behaviour is occurring. This double measurement, although using extra network resources by effectively counting device behaviour twice, provides the network with a failsafe against accidental registers of malicious continuous attachment due to extraneous other factors within the network, such as error.

In an alternative embodiment, the network could count the occurrence of data of a first type indicating handover, and also count the occurrence of data of a second type indicating change of tracking area.

Further embodiments of the invention are shown in the Figures.

DRAWINGS

In the Figures equivalent or similar items are shown with equivalent numbering.

DETAILED DESCRIPTION

Figure 1:
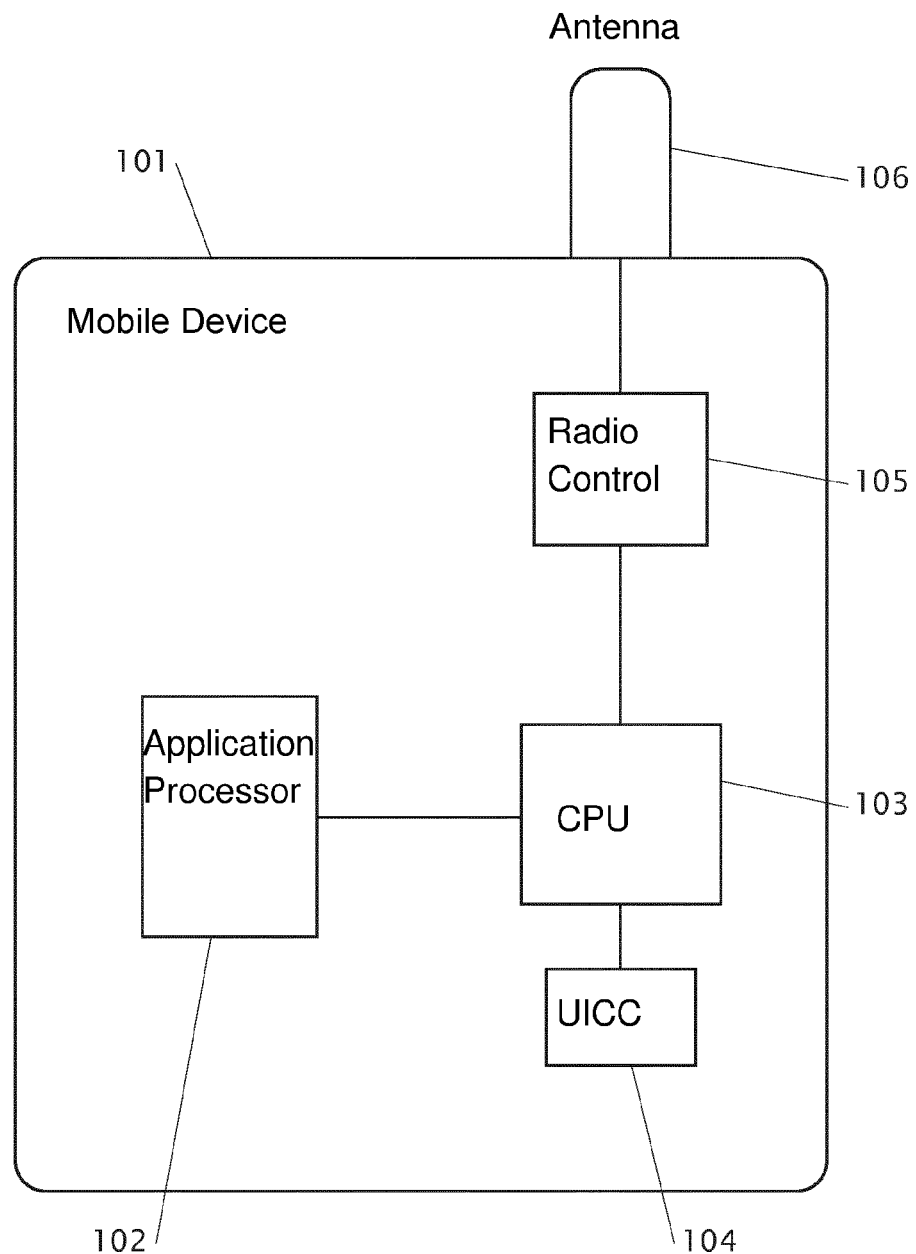
FIG. 1 shows a mobile telecommunications device according to the prior art.

For the purposes of understanding the invention FIG. 1 shows a mobile telecommunications device 101 according to the prior art. Mobile device 101 includes an applications processor 102, a baseband processor, or CPU, 103, which is connected to a UICC 104 and a radio control 105. The radio control 105 controls antenna 106. The UICC 104 is typically a SIM card and includes at least a secret key for authentication purposes.

The applications processor comprises programs for running various functions and features of the mobile operating system of the mobile device and includes programs that have been downloaded from, for example, the internet. The application processor is therefore at risk from malicious programs and can be attacked through the downloading of programs known as application software, known commonly as an 'app', plural 'apps'. Such apps may be malicious in and off themselves, or may include viruses which may cause the mobile device to indulge in behaviour which is malicious.

Malicious behaviour might include repeatedly attaching and detaching to and from the network, repeatedly requesting services, or other behaviours which use up network resources without resulting in a benefit to the mobile device or to the user of the mobile device.

Figure 2:
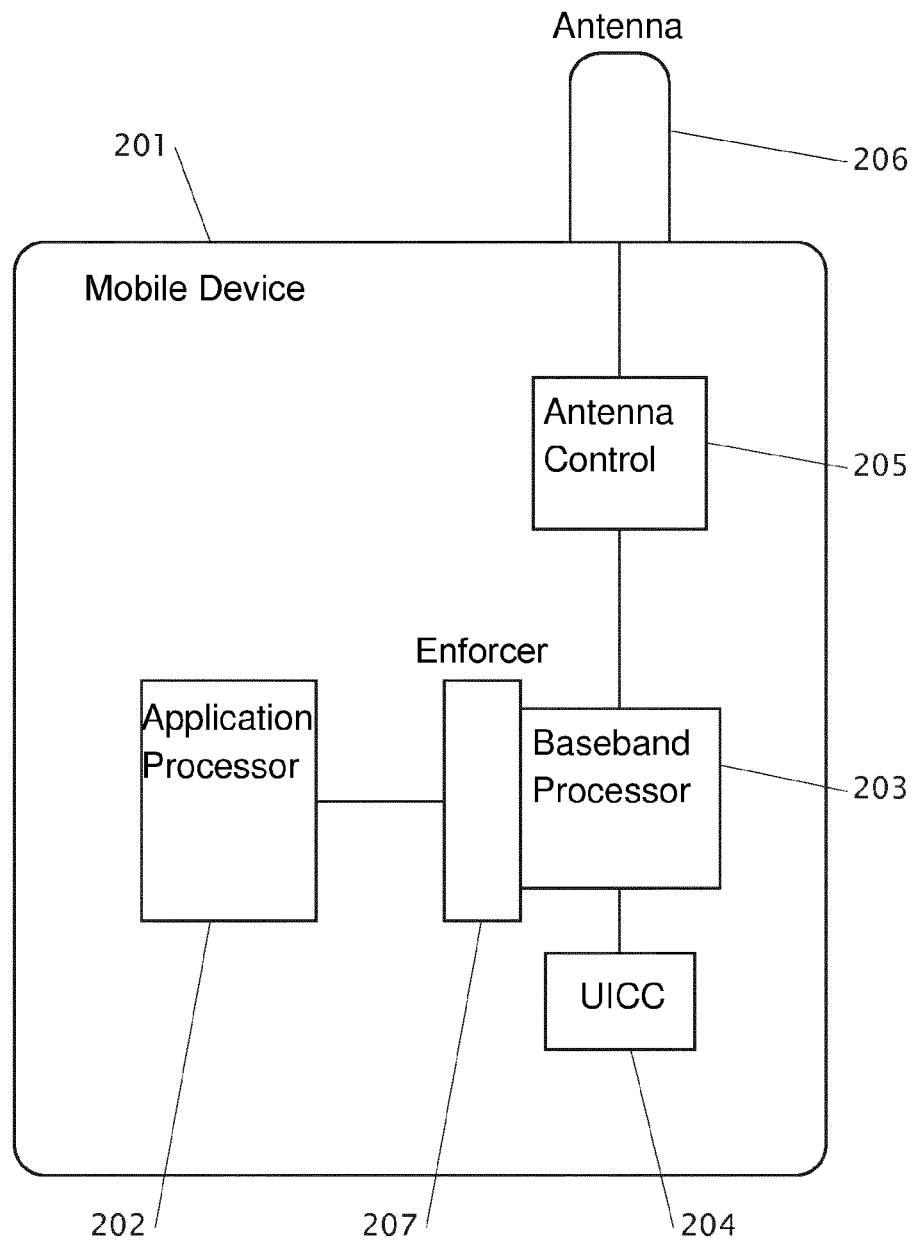
FIG. 2 shows a mobile telecommunications device according to an embodiment of the system of the invention.

FIG. 2 shows a mobile telecommunications device according to an embodiment of the system of the invention. Here mobile device 201 includes an enforcer 207 coupled between application processor 202 and baseband processor 203. Signals from a telecommunications network and received through antenna 206 and transmitted by antenna control 205 directly to baseband processor 203 are seen by enforcer 207 before they can be seen by application processor 202. Application processor 202 is therefore not able to corrupt the working of enforcer 207 or the signals it receives from the network.

Using this mechanism the network can signal instructions to the device. In effect the network is able to take control of the mobile device because the instructions signalled to the device can stop certain actions from being performed by the mobile device.

For example the network can signal the device to withhold a signal which would otherwise be transmitted by the device. Alternatively, the enforcer can limit traffic from the mobile device into the network, for example by reducing the rate at which the mobile device makes certain requests. Alternatively the enforcer can force the mobile to take certain actions that it would not otherwise do, for example suppress or delete a command generated by malicious software. The enforcer takes complete control of messages and signalling between the application and baseband processors and is therefore able to override existing actions of the mobile device.

As can be seen the enforcer is a new entity in the mobile and is separate from the UICC and SIM application. Typically the enforcer is constructed as a separate chip and has an input and output and further comprises a database containing the rule set. It further comprises its own processor and software.

Figure 3:
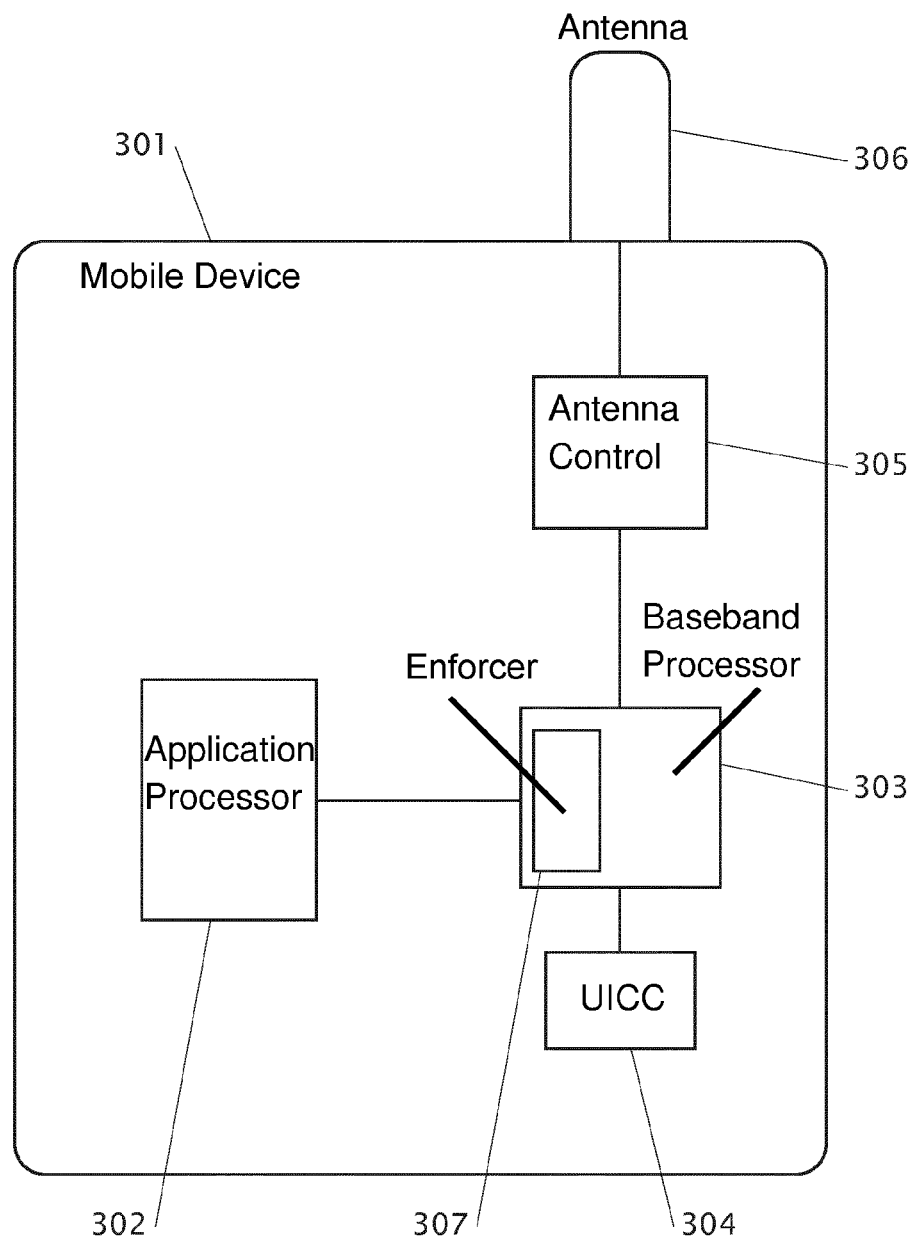
FIG. 3 shows a mobile telecommunications device according to an embodiment of the invention.

FIG. 3 shows a mobile telecommunications device according to an alternative embodiment of the invention. Here enforcer 307 is incorporated into baseband processor 303 as a new hardware component. Here the enforcer 307 is able to perform the same actions as enforcer 207. Enforcer 307 is positioned in the topology of the baseband processor 303 so that it can monitor all communications between baseband processor 303 and application processor 302. In this way signals from a telecommunications network received through antenna 306 and transmitted by antenna control 305 directly to baseband processor 303 are seen by enforcer 307 before they can be seen by application processor 302. Application processor 302 is therefore not able to corrupt the working of enforcer 307 or the signals it receives from the network.

Figure 4:
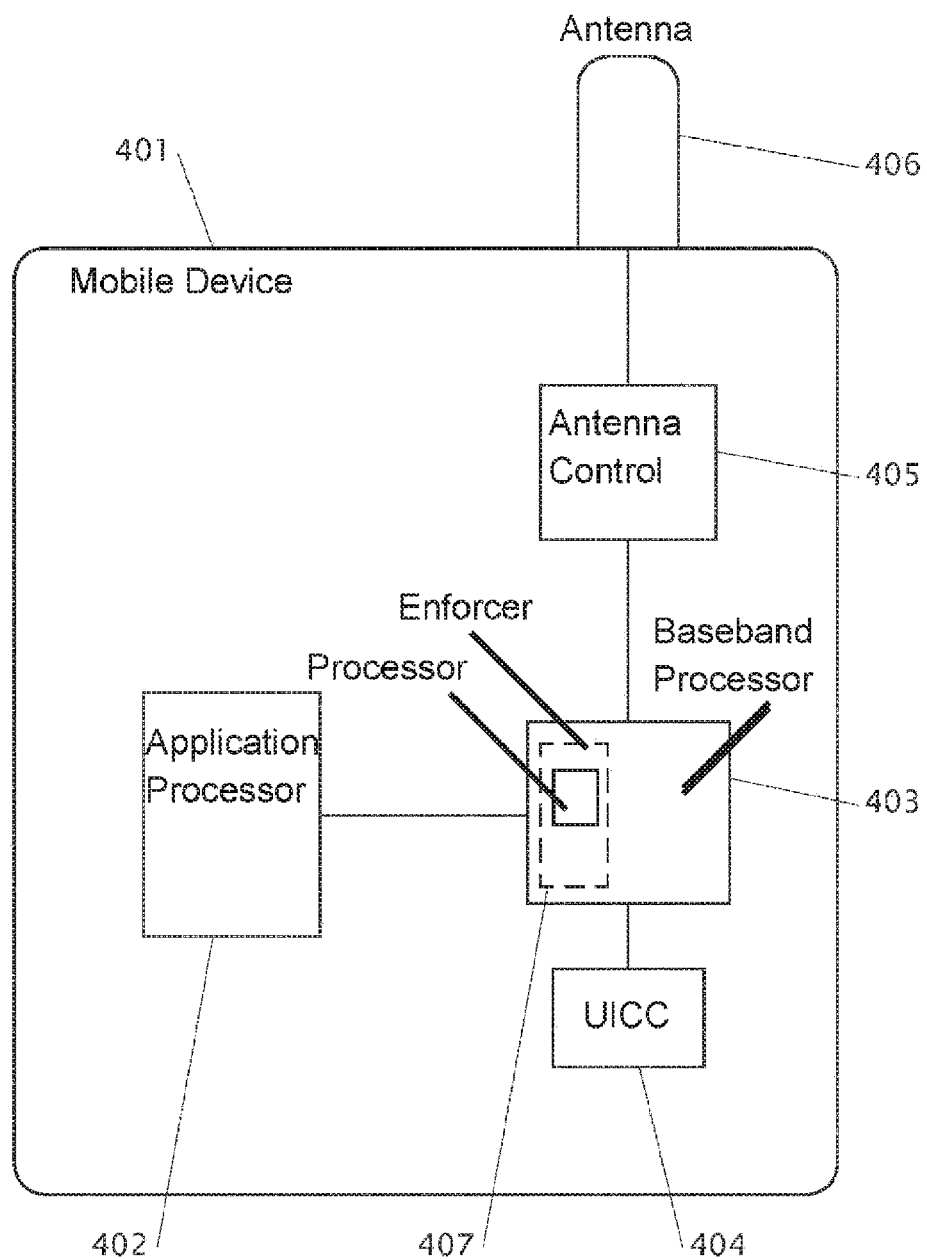
FIG. 4 shows a mobile telecommunications device according to an embodiment of the invention.

FIG. 4 shows a mobile telecommunications device according to an alternative embodiment of the invention. Here enforcer 407 is incorporated into baseband processor 403 as a new software component. Here the enforcer 407 is able to perform the same actions as enforcer 207. Enforcer 407 is incorporated into the working of baseband processor 403 so that it can monitor all communications between baseband processor 403 and application processor 402. In this way signals from a telecommunications network received through antenna 406 and transmitted by antenna control 405 directly to baseband processor 403 are seen by enforcer 407 before they can be seen by application processor 402. Application processor 402 is therefore not able to corrupt the working of enforcer 407 or the signals it receives from the network.

In all embodiments, because the network talks to the enforcer in the mobile device and the enforcer has control over signalling entering and leaving the application processor, the network gains control of the programs on the mobile device through the enforcer. When the network signals the enforcer and the enforcer applies the rules that arise out of the behaviour detected by the network, the rules as applied by the enforcer override all signals that arise out of the application processor. The enforcer acts as an end point for the telecommunications network in its interaction with the mobile device with respect to the described program controlling.

Figure 5:
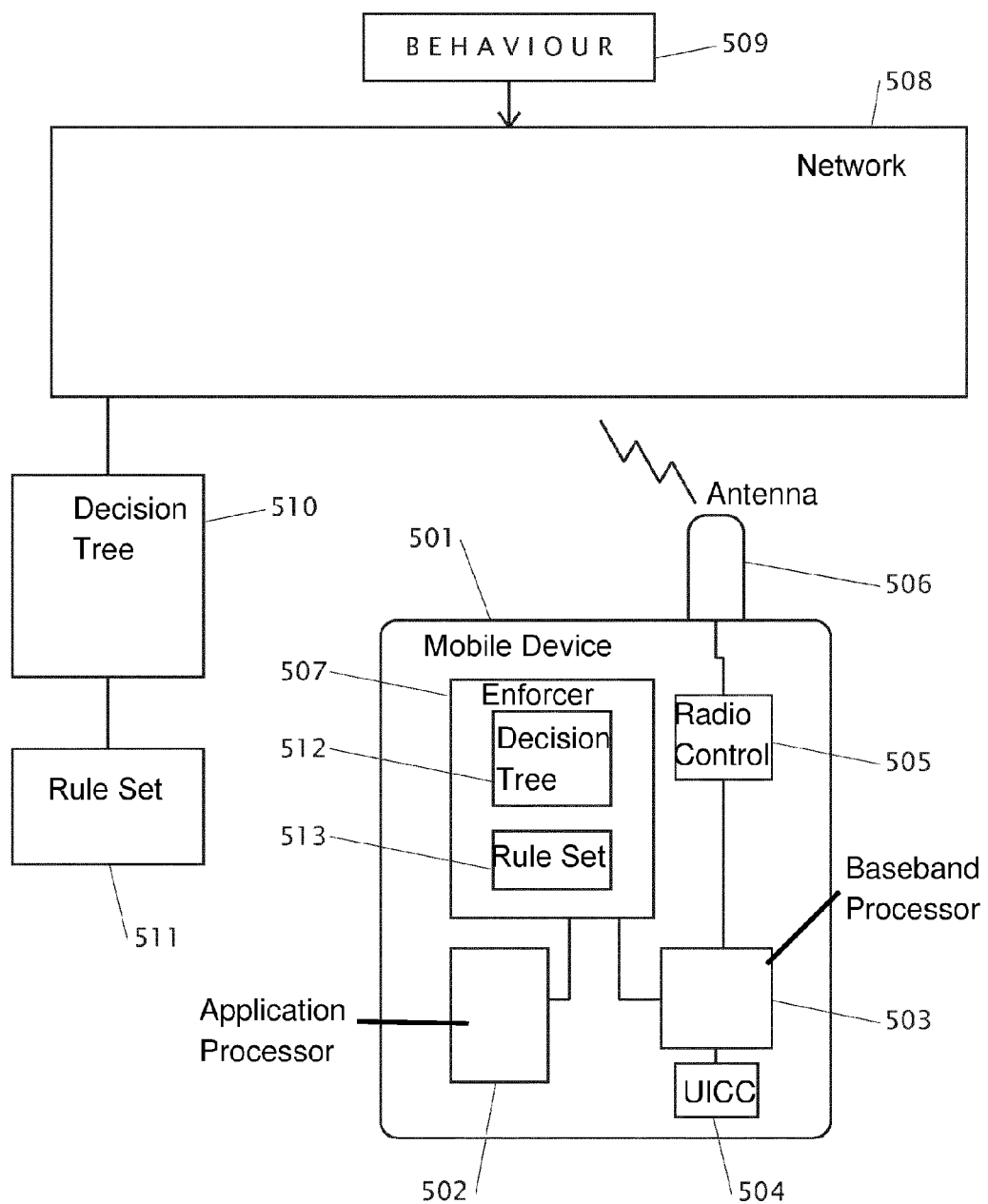
FIG. 5 shows an arrangement for decision taking within an embodiment of the invention.

FIG. 5 shows an arrangement for decision taking within an embodiment of the invention.

A mobile device 501 includes an application processor 502 which has become infected with malicious software. Signals from the software cause the mobile device to indulge in malicious behaviour, possibly through manipulating the actions of the baseband processor 503, the UICC 504 or the radio control 505. The mobile device 501 is attached to the network 508 via antenna 506 and malicious behaviour is detected by the network 509.

When malicious behaviour is detected there are two major embodiments. In one embodiment the network 508 uses decision tree 510 to derive a rule from a rule set 511, which rule can be applied to the mobile device.

The rule is then transmitted by network 508 to mobile device 501 and is received by antenna 506 and passed on to the baseband processor by radio control 505. Enforcer 507 sees the rule, recognises that it is intended for the enforcer and proceeds to act on the rule. The rule is then applied by enforcer 507 to the next communication between application processor 502 and baseband processor 503 to which the rule applies. In this embodiment decisions as to which rule to apply are taken in the network and only the rule resulting from the decision making process is communicated to the mobile device. In particular since decisions are taken within the network it is less important if the mobile device is not trusted.

In the second embodiment the detected behaviour is transmitted to the mobile device 501 for the attention of enforcer 507. In this embodiment when enforcer sees the information relating to the detected behaviour it uses decision tree 512 to derive a rule from a rule set 513, which rule can be applied to the mobile device. Specifically, the rule is applied to the communications between application processor 502 and baseband processor 503 to which the rule applies. In this embodiment some control stays with enforcer 507 which acts according to its ruleset 513. In this embodiment the enforcer does not detect symptoms, but acts according to the programming of its own decision tree 512 and rule set 513.

In both embodiments the enforcer 507 monitors the commands coming from the application processor 502 and applies the rules. The actions of the enforcer are limited only by the extent of the rule set and in particular the embodiment in which decision tree 510 and rule set 511 are used by network 508 allows for a bigger rule set.

Typically the enforcer is provisioned at initial set up of mobile device 501.

Figure 6:
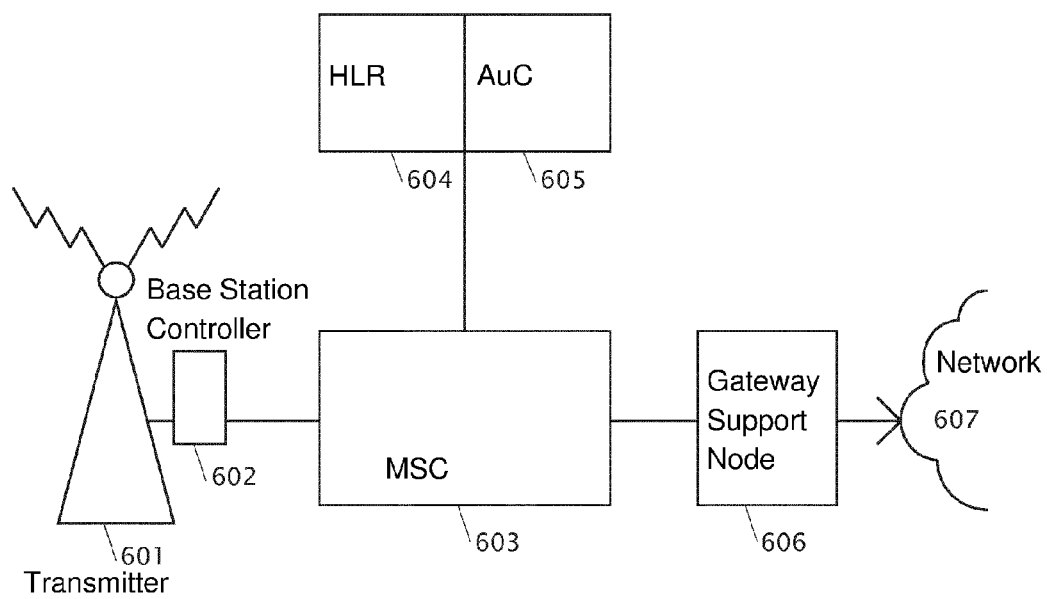
FIG. 6 shows a telecommunication network in which abnormal behaviour of the mobile can be detected.

FIG. 6 shows a telecommunications network in which malicious behaviour is detected. As is known by the skilled person there are multiple technologies described by various telecommunication standards that define telecommunications systems. Typically they include the following layout though the skilled person knows and appreciates that there may be small variations and differences in the way systems work.

A telecommunications network includes a transmitter 601. This is usually called a base station, cell tower, or, in an LTE network an eNodeB. The transmitter is controlled by a base station controller 602, though in, for example, a UMTS network this would be a Radio Network Controller 602 and in, for example, an LTE network the control functions of the base station controller 602 may be subsumed into the eNodeB. Radio signals from hand held mobile devices are received at the transmitter 601, processed into signals and transmitted to the core network.

In the case of a GSM or 2G network the signals are passed to a Mobile Switching Centre, MSC, 603, which routes calls. Upon first receiving signal from a mobile it will query the Home Location Register, HLR, 604, which holds data on mobile subscribers to verify if the signal received is from a mobile device which is subscribed to the network. In order to authenticate the mobile device it will use keys held in the Authentication Centre, AuC, 605.

In the case of a UTMS or 3G network the verified and authenticated signals may be routed through a Gateway Support Node 606.

In the case of an LTE or 4G network the signals are passed to a Mobility Management Entity, MME, 603 and the mobile is verified and authenticated at the Home Subscriber Server, HSS, 604/605. Calls are then further routed through a Serving Gateway 606 to a further network 607 which may be the internet.

Figure 7:
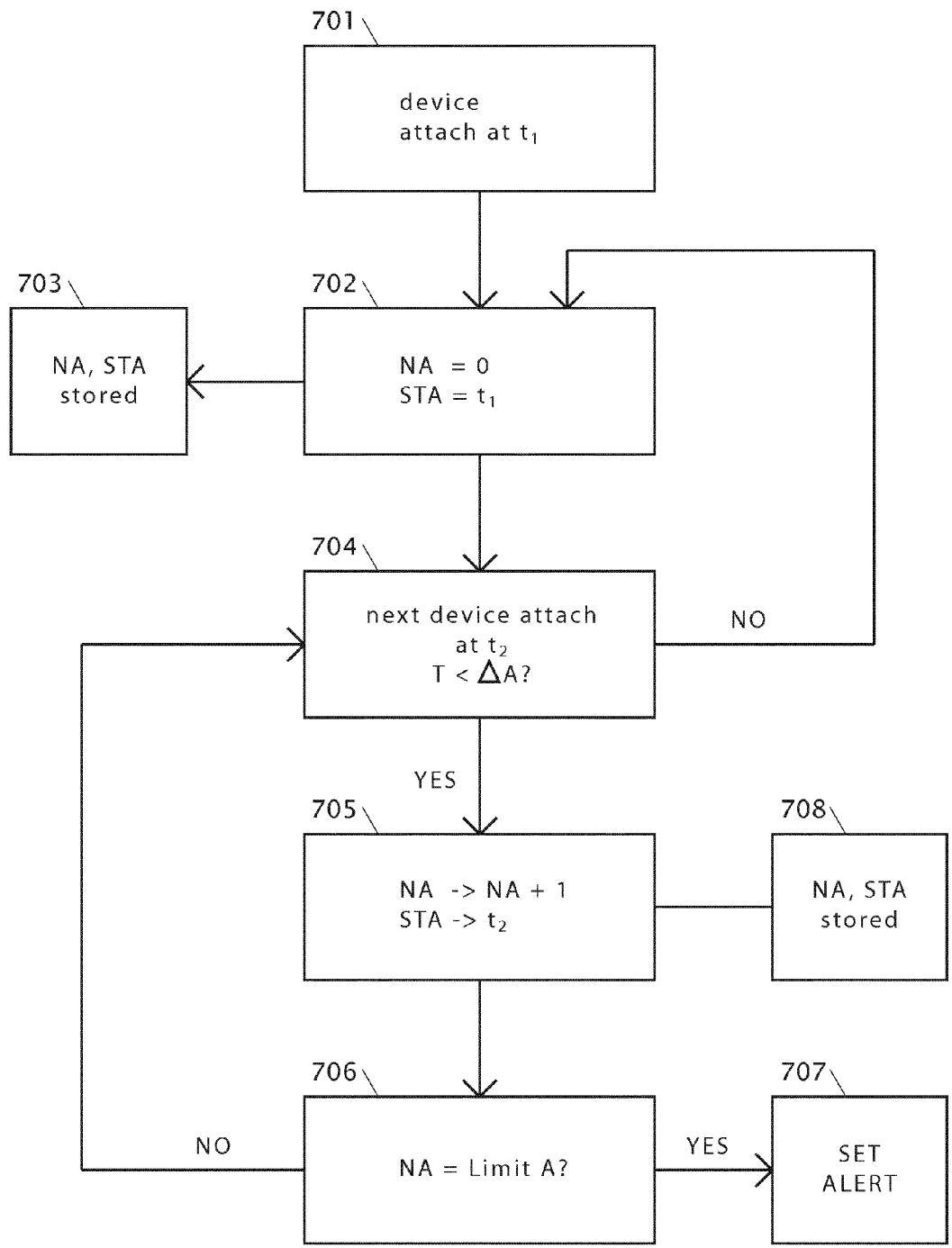
FIG. 7 shows a flow diagram of an embodiment of detection of malicious, or abnormal, behaviour.

FIG. 7 shows a flow diagram of an embodiment of detection of malicious behaviour suitable for detecting excessive attaches of a mobile device to a telecommunications network. In an advantageous embodiment a device attaches 701 to the network at time $t_1$ through a base station and the network registers the attach, identifies the mobile device and begins authentication procedures. In parallel with the normal processing of the attach request the network performs the following steps. A counter NA, a start time STA and a timer are initiated 702. Typically the counter will be set to zero and in an advantageous embodiment the timer set to time $t_1$ registered by the network. The counter value and start time are stored 703 for future reference. The next time an attach is registered for the same device, say at time $t_2$ the elapsed time T, equal to:

$$t_2 - STA$$

is compared with a predetermined time interval $\Delta A$ 704.

If: $T = \Delta A$, or, $T > \Delta A$, the counter NA and the timer are cleared, 702.

If: $T < \Delta A$, the counter NA is increased by a value of 1 and the value of STA is replaced by the time $t_2$, 705. NA and STA are again stored 708. In this case the counter value is further compared with a predetermined threshold, LimitA, 706.

If: NA = LimitA, an alert is set. If not, the method returns to step 704.

The skilled person will understand there are minor variations which can be made to the embodiment which will still work. For example, the counter could be increased if T is less than or equal to $\Delta A$ and only cleared if T is greater than $\Delta A$. Also for example, LimitA could be a value which must be exceeded, in which case an alert flag would be set if NA > LimitA. In another advantageous embodiment a counter could be decremented instead of clearing the counter NA in step 702 if the value of the counter is larger than 0.

As the skilled person will understand, appropriate values for LimitA and the predetermined time interval $\Delta A$ will vary depending on the network and the customer base. However, suitable values are $\Delta A = 500$ ms and LimitA = 10.

The method as described allows a network to detect malicious behaviour in the form of excessive attach requests from an infected mobile and in an advantageous embodiment would be performed in the MSC, Serving Gateway or MME of the network, as appropriate.

Figure 8:
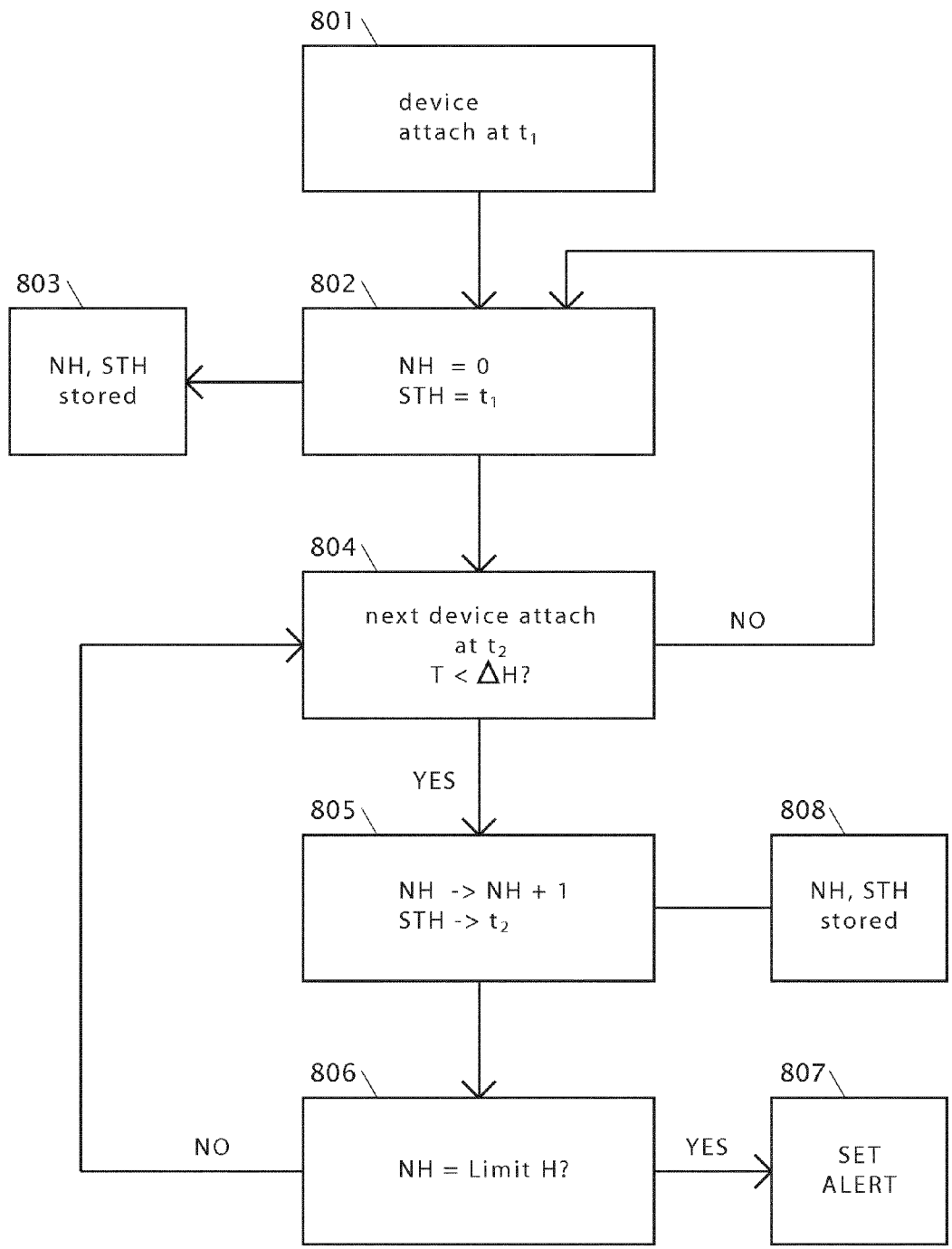
FIG. 8 shows a flow diagram of an embodiment of detection of malicious, or abnormal, behaviour.

FIG. 8 shows a flow diagram of an embodiment of detection of malicious behaviour suitable for detecting excessive handovers of a mobile device in a telecommunications network and in a particularly advantageous embodiment would be performed in the MME of the network, which is informed of handovers before the handover takes place, referred to as an S1-handover, or after the handover has occurred, referred to as an X2-handover.

In order to carry out the method the MME performs the following steps for a group of mobile devices in its area. The group of devices monitored could be the group consisting of all mobile devices in its area, but could also be a sub-group of this group or some other further defined group. For example, the group of mobiles which are monitored could consist, say, of all new mobiles, or of mobiles whose previous activity suggests they might be at risk of infection, for example if they make frequent download requests, or of mobiles which are registered to particular users, says users who frequently change mobiles.

In this advantageous embodiment a device attaches 801 to the network at time $t_1$ through a base station and the network registers the attach, identifies the mobile device and begins authentication procedures. In parallel with the normal processing of the attach request the network performs the following steps. A counter NH, a start time STH and a timer are initiated 802. Typically the counter will be set to zero and in an advantageous embodiment the timer set to time $t_1$ registered by the network. The counter value and start time are stored 803 for future reference. The next time an attach is registered by the same device, say at time $t_2$ the elapsed time T, equal to:

$$t_2 - STH$$

is compared to a predetermined time interval $\Delta H$ 804.

If: $T=\Delta H$, or, $T>\Delta H$, the counter NH and the timer are cleared, 805.

If: $T<\Delta H$, the counter NH is increased by a value of 1 and the value of STH is replaced by the time $t_2$, 805. NH and STH are again stored 808. In this case the counter value is further compared with a predetermined threshold, LimitH, 806.

If: NH=LimitH, an alert is set. If not, the method returns to step 804.

Again, the skilled person will understand there are minor variations which can be made to the embodiment which will still work. For example, the counter could be increased if T is less than or equal to $\Delta A$ and only cleared if T is greater than $\Delta A$. Also for example, LimitH could be a value which must be exceeded, in which case an alert flag would be set if NH>LimitH.

The particular advantages of the invention are that a telecommunications network can monitor for malicious activity in mobile devices and identify when a particular device is potentially infected by malware. Although use of the invention requires network resources that would otherwise not be expended, it allows the easy identification of devices which may use up far greater network resources if left unidentified.

As the skilled person will understand, appropriate values for LimitH and the predetermined time interval $\Delta H$ will vary depending on the network and the customer base. However, suitable values are $\Delta H=2s$ and LimitH=20.

The invention claimed is:

1. A system for control of a mobile telecommunications device, the system comprising:
a telecommunications network configured to allow communication by mobile telecommunications devices, and at least one mobile telecommunications device arranged to communicate with the telecommunications network,
the mobile telecommunications device comprising an enforcer configured to act on the mobile telecommunications device under instruction from the telecommunications network by applying a rule to the mobile telecommunications device, and wherein the telecommunications network is configured to control the mobile telecommunications device by signalling the rule to the enforcer, and wherein the rule is selected based upon abnormal behaviour of the mobile telecommunications device being detected by the telecommunications network, and wherein application of the signalled rule by the enforcer is intended to stop the abnormal behaviour.

2. The system according to claim 1 wherein the enforcer is a hardware component within the mobile telecommunications device.

3. The system according to claim 2 wherein the mobile telecommunications device comprises a baseband processor and the enforcer is coupled to the baseband processor.

4. The system according to claim 3 wherein the enforcer is coupled to the baseband processor by a dedicated channel.

5. The system according to claim 4 wherein the mobile telecommunications device further comprises an application processor and wherein the application processor is coupled to the baseband processor through the enforcer and the dedicated channel.

6. The system according to claim 1 wherein the mobile telecommunications device comprises a baseband processor and wherein the enforcer is comprised within the baseband processor.

7. The system according to claim 1 wherein the mobile telecommunications device comprises a baseband processor and wherein the enforcer is a software application in the baseband processor.

8. The system according to claim 1 wherein the telecommunications network further comprises a decision tree and rule set and is configured to control the mobile telecommunications device by using the decision tree to select the rule from the rule set.

9. The system according to claim 1 wherein the enforcer further comprises a decision tree and rule set and wherein the telecommunications network is configured to signal a decision prompt to the enforcer and wherein the enforcer is configured to apply the decision prompt to the rule set to derive the appropriate rule.

10. The system according to claim 1 wherein the signals from the telecommunications network to the enforcer are transmitted via a base station or node-B.

11. The system according to claim 1 wherein the telecommunications network is arranged to detect behaviour which indicates that the mobile telecommunications device is behaving abnormally within the telecommunications network.

12. A mobile telecommunications device arranged to communicate with a telecommunications network,
the mobile telecommunications device comprising an enforcer, and the enforcer having a processor and program instructions that, when executed by the processor of the enforcer, cause the enforcer to act on the mobile telecommunications device under instruction from the telecommunications network by applying a rule to the mobile telecommunications device, wherein the enforcer is arranged to control the mobile telecommunications device in response to signals from the telecommunications network, the signals indicating that the telecommunications device is behaving abnormally within the telecommunications network and comprising a rule based upon the abnormal behaviour, and wherein application of the signalled rule by the enforcer is intended to stop the abnormal behaviour.

* * * * *